(12) United States Patent
Chen

(10) Patent No.: US 12,181,786 B2
(45) Date of Patent: Dec. 31, 2024

(54) WAVELENGTH CONVERSION ELEMENT AND PROJECTION DEVICE

(71) Applicant: Coretronic Corporation, Hsin-Chu (TW)

(72) Inventor: Fa-Chih Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 196 days.

(21) Appl. No.: 17/859,047

(22) Filed: Jul. 7, 2022

(65) Prior Publication Data

US 2023/0015601 A1    Jan. 19, 2023

(30) Foreign Application Priority Data

Jul. 8, 2021   (CN) .......................... 202121546838.2

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2066* (2013.01)

(58) Field of Classification Search
CPC . G03B 21/204; G03B 21/2066; G02B 26/008
See application file for complete search history.

(56) References Cited

U.S. PATENT DOCUMENTS

| | | | |
|---|---|---|---|
| 2017/0099467 A1 | 4/2017 | Egawa | |
| 2017/0353701 A1 | 12/2017 | Egawa | |
| 2018/0095349 A1* | 4/2018 | Egawa | H04N 9/3161 |
| 2022/0206373 A1* | 6/2022 | Hsu | G03B 21/204 |
| 2022/0276550 A1* | 9/2022 | Chen | G03B 21/16 |
| 2022/0326592 A1* | 10/2022 | Chen | G03B 21/16 |
| 2022/0413372 A1* | 12/2022 | Chen | G03B 21/204 |

FOREIGN PATENT DOCUMENTS

| | | |
|---|---|---|
| CN | 211123610 | 7/2020 |
| CN | 211289978 U | 8/2020 |

OTHER PUBLICATIONS

U.S. Appl. No. 17/711,058, filed Apr. 1, 2022, Inventors: I-Hua Chen and Chi-Tang Hsieh.

* cited by examiner

*Primary Examiner* — Magda Cruz

(57) ABSTRACT

A wavelength conversion element includes a rotatable disc, a first spoiler structure and a second spoiler structure. The rotatable disc has a supporting surface and a back surface opposite to the supporting surface. The first spoiler structure is disposed on the supporting surface and arranged along a first track surrounding a center of the rotatable disc. The second spoiler structure is disposed on the back surface and arranged along a second track surrounding the center. A centroid of at least one of the first spoiler structure and the second spoiler structure is deviated from the center. A projection device adopting the aforementioned wavelength conversion element is also provided. The wavelength conversion element of the invention can reduce the initial unbalance and the projection device of the invention can improve the durability.

20 Claims, 17 Drawing Sheets

WAVELENGTH CONVERSION ELEMENT AND PROJECTION DEVICE

CROSS-REFERENCE TO RELATED APPLICATION

This application claims the priority benefit of China application (202121546838.2), filed on Jul. 8, 2021. The entirety of the above-mentioned patent application is hereby incorporated by reference herein and made a part of this specification.

FIELD OF THE INVENTION

The invention relates to a wavelength conversion element, and more particularly to a wavelength conversion element used in a projection device and a projection device adopting the wavelength conversion element.

BACKGROUND OF THE INVENTION

The wavelength conversion element (such as a phosphor wheel) equipped in the existing laser projection device rotates at a high speed during operation. The projection device may have obvious vibration and noise if the wavelength conversion element has a slight unbalance. Therefore, the dynamic balance quality of the wavelength conversion element is very important to the experience of the projection device.

The existing wavelength conversion element (phosphor wheel) is usually equipped with a wavelength conversion layer (phosphor layer) and a light-transmitting plate. The wavelength conversion layer (phosphor layer) includes a variety of wavelength conversion materials to convert the excitation beam into color lights with different wavelengths. On the other hand, the light-transmitting plate can allow the excitation beam to pass through, and the excitation beam that passes through the light-transmitting plate can form the beam required for the projection image together with the above-mentioned color light. However, the density of each wavelength conversion material is different from each other, and the density of each wavelength conversion material is different from that of the light-transmitting plate. Therefore, the existing wavelength conversion element (phosphor wheel) often has a large initial amount of unbalance. Thus, it is necessary to install a large amount of counterweight glue to reduce the initial unbalance, which causes the load of a motor to increase and therefore affecting the service life of the motor.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion element to reduce the initial unbalance.

The invention provides a projection device to improve durability.

Other advantages and objects of the invention may be further illustrated by the technical features broadly embodied and described as follows.

In order to achieve one or a portion of or all of the objects or other objects, an embodiment of the invention provides a wavelength conversion element, which includes a rotatable disc, a first spoiler structure and a second spoiler structure. The rotatable disc has a supporting surface and a back surface opposite to the supporting surface. The first spoiler structure is disposed on the supporting surface and arranged along a first track surrounding a center of the rotatable disc. The second spoiler structure is disposed on the back surface and arranged along a second track surrounding the center. A centroid of at least one of the first spoiler structure and the second spoiler structure is deviated from the center.

In order to achieve one or a portion of or all of the objects or other objects, an embodiment of the invention provides a projection device, which includes an illumination system, a light valve and a projection lens. The illumination system is configured to provide an illumination beam. The light valve is disposed on a transmission path of the illumination beam and configured to convert the illumination beam into an image beam. The projection lens is disposed on a transmission path of the image beam and configured to project the image beam. The illumination system includes an excitation light source and the aforementioned wavelength conversion element. The excitation light source is configured to provide an excitation beam. The wavelength conversion element is disposed on a transmission path of the excitation beam.

In the wavelength conversion element of the invention, because the centroid of at least one of the first spoiler structure and the second spoiler structure disposed on opposite sides of the rotatable disc deviates from the center of the rotatable disc, the position of the centroid of the rotatable disc can be adjusted in the axial and radial directions of the rotatable disc, thereby reducing the initial unbalance of the rotatable disc. In this way, the wavelength conversion element of the invention can reduce or even omit the installation of counterweight glue. Because the use amount of counterweight glue is reduced, it can prevent the service life of the motor from being affected by the excessive use of counterweight glue, and can also reduce the quality difference caused by the counterweight glue heated or irradiated by light, and thereby preventing the initial unbalance from increasing. In addition, the projection device of the invention can improve the durability due to adopting the aforementioned wavelength conversion element.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
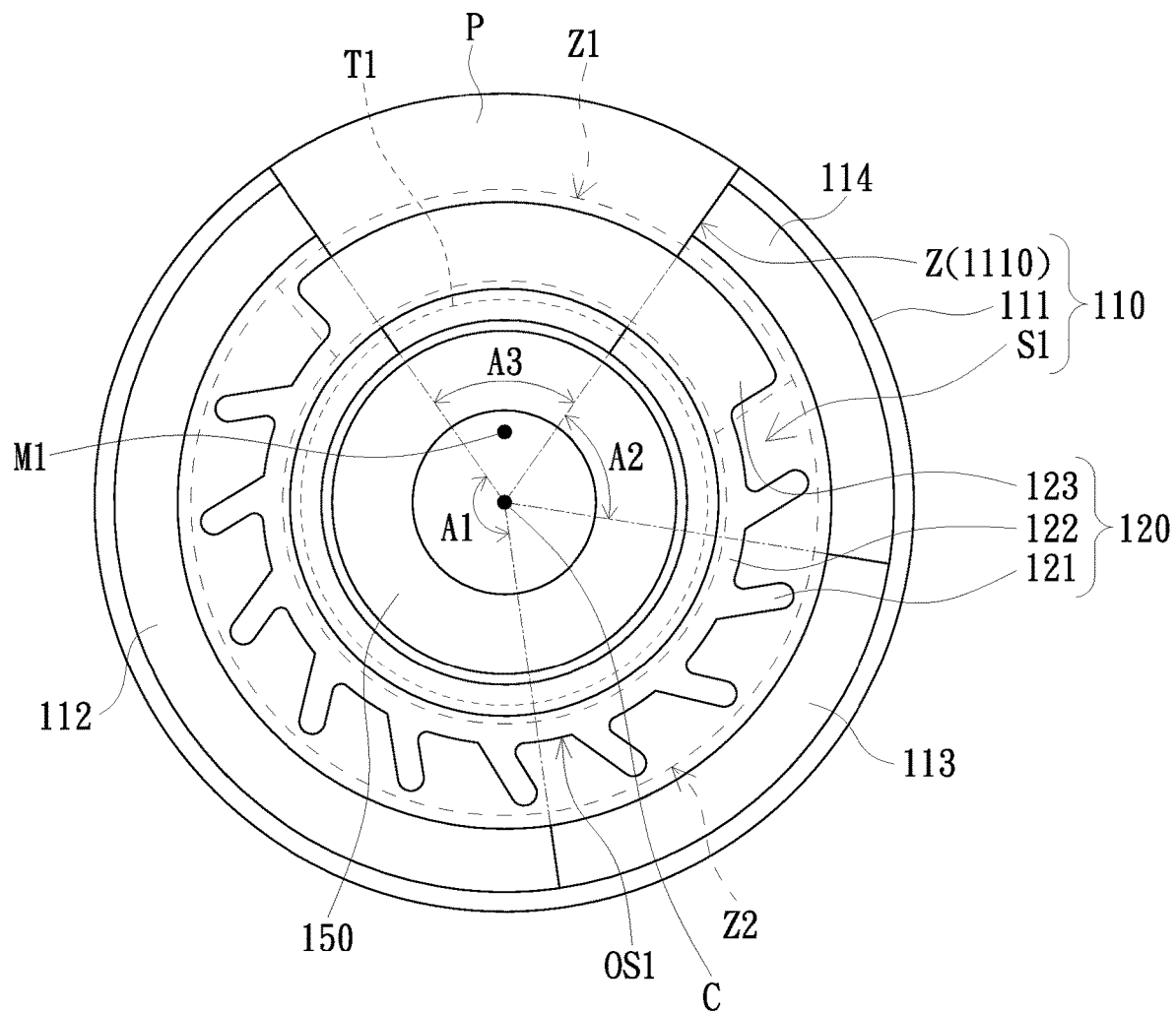
FIG. 1 is a schematic top view of a wavelength conversion element according to an embodiment of the invention.
Figure 2:
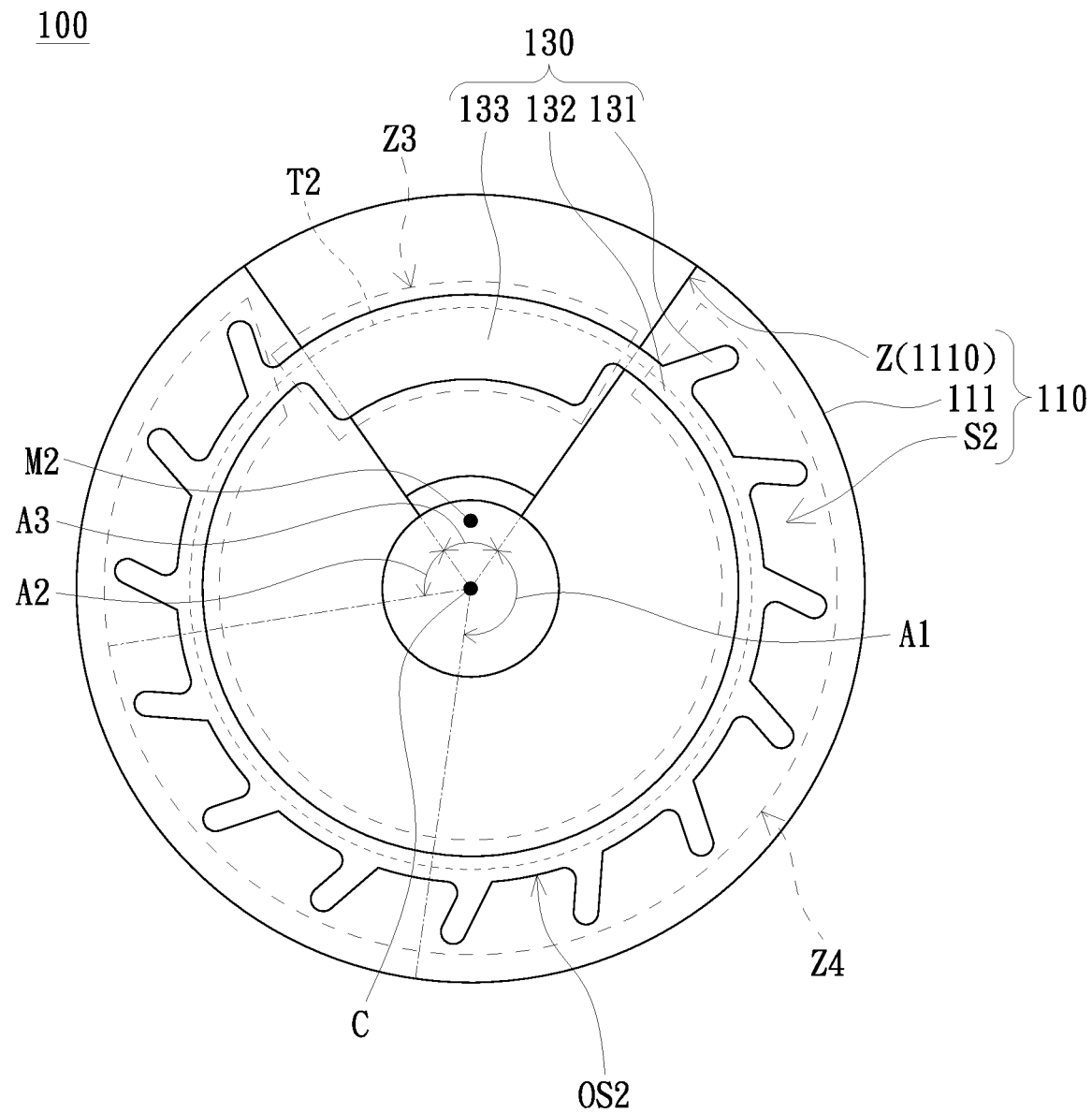
FIG. 2 is a schematic bottom view of the wavelength conversion element of FIG. 1.
Figure 3:
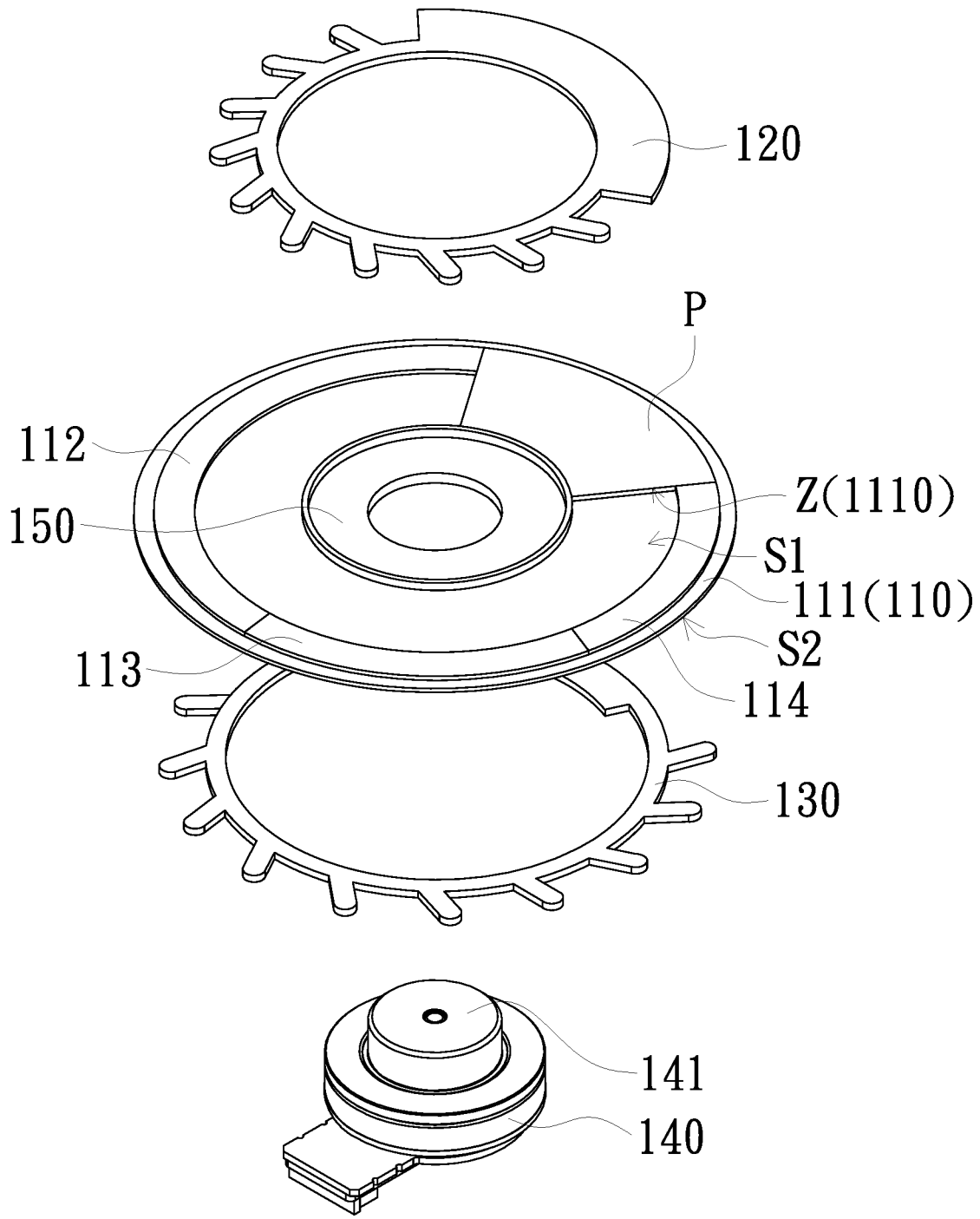
FIG. 3 is an exploded schematic diagram of the wavelength conversion element of FIG. 1.

FIG. 1 is a schematic top view of a wavelength conversion element according to an embodiment of the invention. FIG. 2 is a schematic bottom view of the wavelength conversion element of FIG. 1. FIG. 3 is an exploded schematic diagram of the wavelength conversion element of FIG. 1. Please refer to FIGS. 1, 2 and 3. The wavelength conversion element 100 includes a rotatable disc 110, a first spoiler structure 120 and a second spoiler structure 130. The rotatable disc 110 has a supporting surface S1 and a back surface S2 opposite to the supporting surface S1. The first spoiler structure 120 is disposed on the supporting surface S1 and is arranged along the first track T1 surrounding the center C of the rotatable disc 110. The second spoiler structure 130 is disposed on the back surface S2 and is arranged along the second track T2 surrounding the center C. At least one of the centroid M1 of the first spoiler structure 120 and the centroid M2 of the second spoiler structure 130 is deviated from the center C. For example, the centroid M1 and the centroid M2 in this embodiment are both deviated from the center C, but the invention is not limited thereto. In addition, the first track T1 and the second track T2 each may include a circular track around the center C. The first track T1 is, for example, located on the supporting surface S1, and the second track T2 is, for example, located on the back surface S2, but the invention is not limited thereto.

The rotatable disc 110 may include an annular substrate 111 and wavelength conversion layers 112, 113 and 114. In detail, the wavelength conversion layers 112, 113 and 114 may be disposed on the supporting surface S1 of the annular substrate 111. The material of the annular substrate 111 may include metal (e.g., aluminum, copper, and silver), non-metal, ceramic, or other composite materials with high temperature resistance and high thermal conductivity. In addition, the annular substrate 111 may further have a wavelength maintenance zone 1110. The wavelength maintenance zone 1110 is, for example, an opening Z of the annular substrate 111 and is provided with a plate P. The shape of the plate P may correspond to the shape of the wavelength maintenance zone 1110, so that the plate P may be, for example, embedded in the wavelength maintenance zone 1110. The plate P in this embodiment is, for example, a light-transmitting plate or a glass sheet for allowing the excitation beam to pass through. A light-diffusing layer or a light-diffusing microstructure may be provided on the aforementioned light-transmitting plate to eliminate the speckles formed by the excitation beam. In addition, because the wavelength maintenance zone 1110 itself is the opening Z, the wavelength maintenance zone 1110 may allow the excitation beam to direct pass through without providing the plate P or other optical elements. The plate P in one embodiment may be a reflective plate to reflect the excitation beam. The wavelength maintenance zone 1110 in another embodiment may be a part of the supporting surface S1 or a reflective layer disposed on the supporting surface S1 to reflect the excitation beam.

Please continue to refer to FIG. 1. The wavelength conversion layers 112, 113 and 114 can be configured to convert the wavelength of the excitation beam. For example, the wavelength conversion layers 112, 113 and 114 may respectively emit green light, red light and yellow light after being irradiated by the excitation beam, but other embodiments are not limited thereto. For example, in one embodiment, the quantity of the aforementioned wavelength conversion layer may be one, and the wavelength conversion layer may emit yellow light after being irradiated by the excitation beam. In another embodiment, the quantity of the aforementioned wavelength conversion layers may be two, and the two wavelength conversion layers may respectively emit green light and yellow light after being irradiated by the excitation beam. It is understood that the quantity of the aforementioned wavelength conversion layers may be more than three, and the invention does not limit the specific quantity of the wavelength conversion layers. The wavelength conversion layers 112, 113 and 114 of this embodiment may include wavelength conversion materials for converting the wavelength of the excitation beam. The aforementioned wavelength conversion materials may include, for example, fluorescent materials, phosphorescent materials (e.g., phosphors), or nanomaterials (e.g., quantum dots), but are not limited thereto. It should be noted that the density of the wavelength conversion layer 112 is, for example, greater than the density of the wavelength conversion layers 113 and 114, and the density of the wavelength conversion layer 114 is, for example, slightly smaller than the density of the wavelength conversion layer 113. In addition, the density of the wavelength maintenance zone 1110 is, for example, smaller than the density of the wavelength conversion layers 112, 113 and 114. Thus, the rotatable disc 110 has an initial unbalance due to the density difference between the wavelength maintenance zone 1110 and the wavelength conversion layers 112, 113 and 114. Specifically, the aforementioned initial unbalance may cause the centroid (not shown) of the rotatable disc 110 to deviate from the center C of the rotatable disc 110. Furthermore, the centroid of the rotatable disc 110 may deviate from the center C in the axial and/or radial directions of the annular substrate 111. Therefore, in this embodiment, the first spoiler structure 120 and the second spoiler structure 130 are configured to adjust the position of the aforementioned centroid in the axial and radial directions of the rotatable disc 110 to reduce the initial unbalance of the rotatable disc 110.

In detail, the first spoiler structure 120 may include a first zone Z1 and a second zone Z2, and the mass density of the first zone Z1 is greater than the mass density of the second zone Z2. The mass density of the first zone Z1 and the mass density of the second zone Z2 of the first spoiler structure 120 have a first difference. Similarly, as shown in FIG. 2, the second spoiler structure 130 may also include a first zone Z3 and a second zone Z4, and the mass density of the first zone Z3 is greater than the mass density of the second zone Z4. The mass density of the first zone Z3 and the mass density of the second zone Z4 of the second spoiler structure 130 have a second difference. In this embodiment, the first difference is, for example, greater than the second difference. In other embodiments, the first difference may be greater than, equal to, or smaller than the second difference, depending on factors such as the position of the centroid of the rotatable disc 100, the configuration of the wavelength conversion layers 112, 113, 114 and the wavelength maintenance zone 1110, etc.

Please refer to FIGS. 1 and 2 together. In this embodiment, the wavelength conversion layer 112 with the highest density occupies the first central angle A1 of the annular substrate 111, and the wavelength conversion layer 114 with the smallest density occupies the second central angle A2 of the annular substrate 111. In order to adjust the position of the centroid of the rotatable disc 110, within the first central angle A1, the angle occupied by the first zone Z1 may be smaller than the angle occupied by the second zone Z2, and the angle occupied by the first zone Z3 may be smaller than the angle occupied by the second zone Z4. On the other hand, within the second central angle A2, the angles occupied by the first zones Z1, Z3 and the second zones Z2, Z4 can be adjusted according to the situation due to that the angles required for the first zones Z1, Z3 and the second zones Z2, Z4 to occupy depend on the cooperation of the first spoiler structure 120 and the second spoiler structure 130. For example, within the second central angle A2 of this embodiment, the angle occupied by the first zone Z1 may be greater than the angle occupied by the second zone Z2, and the angle occupied by the first zone Z3 may be smaller than the angle occupied by the second zone Z4. However, within the second central angle A2 in one embodiment, the angle occupied by the first zone Z3 may be greater than or equal to the angle occupied by the second zone Z4. Similarly, within the second central angle A2 in another embodiment, the angle occupied by the first zone Z1 may be smaller than or equal to the angle occupied by the second zone Z2. It is understood that the proportions of the first zones Z1, Z3 and the second zones Z2, Z4 within the first central angle A1 and the second central angle A2 can be adjusted according to actual conditions. For example, the second zone Z2 or Z4 may occupy all the first central angle A1 in one embodiment; and the first zone Z1 or Z3 may occupy all the second central angle A2 in another embodiment.

Similarly, because the annular substrate 111 of this embodiment is provided with a wavelength maintenance zone 1110, it may be required to further consider the influence of the wavelength maintenance zone 1110 on the centroid of the rotatable disc 110 when adjusting the position of the centroid of the rotatable disc 110. For example, the wavelength maintenance zone 1110 may occupy the central angle A3 of the annular substrate 111. In order to adjust the position of the centroid of the rotatable disc 110, within the central angle A3, the angle occupied by the first zone Z1 may be greater than the angle occupied by the second zone Z2, and the angle occupied by the first zone Z3 may be greater than the angle occupied by the second zone Z4. For example, in this embodiment, the first zone Z1 of the first spoiler structure 120 can occupy almost all the central angle A3, but the invention is not limited thereto. Incidentally, in one embodiment, the wavelength maintenance zone 1110 can be configured as a reflection zone of the excitation beam, and the density of the wavelength maintenance zone 1110 is also smaller than the density of the wavelength conversion layers 112, 113 and 114.

The following will describe how the first spoiler structure 120 has a first zone Z1 and a second zone Z2 with different mass densities and how the second spoiler structure 130 has a first zone Z3 and a second zone Z4 with different mass densities in this embodiment. Please refer to FIG. 1 first. In this embodiment, the first spoiler structure 120 may include a plurality of first spoilers 121. Specifically, the first spoiler structure 120 may further include a first annular member 122, and the first annular member 122 overlaps the first track T1. The first spoilers 121 are radially distributed on the supporting surface S1 along the first track T1, and one end of each first spoiler 121 is connected to the outer annular surface OS1 of the first annular member 122. In addition, the first spoiler structure 120 of this embodiment may further include a first counterweight plate 123, which is connected to the first annular member 122. Furthermore, the weight of the first counterweight plate 123 is, for example, greater than the weight of each first spoiler 121. The first counterweight plate 123 is, for example, disposed in the first zone Z1, and the first spoilers 121 are, for example, disposed in the second zone Z2, so that the mass density of the first zone Z1 is greater than the mass density of the second zone Z2. Incidentally, the distance between any two adjacent first spoilers 121 in the second zone Z2 may be 2 times or more (preferably 2.5 times or more) than the distance between the first counterweight plate 123 in the first zone Z1 and the boundary of the first zone Z1, but the invention is not limited thereto.

Similarly, please refer to FIG. 2 again. The second spoiler structure 130 may include a plurality of second spoilers 131. Specifically, the second spoiler structure 130 may further include a second annular member 132, and the second annular member 132 overlaps the second track T2. The second spoilers 131 are radially distributed on the back surface S2 along the second track T2, and one end of each second spoiler 131 is connected to the outer annular surface OS2 of the second annular member 132. In addition, the second spoiler structure 130 of this embodiment may further include a second counterweight plate 133, which is connected to the second annular member 132. Furthermore, the weight of the second counterweight plate 133 is, for example, greater than the weight of each second spoiler 131. The second counterweight plate 133 is, for example, disposed in the first zone Z3, and the second spoilers 131 are, for example, disposed in the second zone Z4, so that the mass density of the first zone Z3 is greater than the mass density of the second zone Z4. Incidentally, the distance between any two adjacent second spoilers 131 in the second zone Z4 may be 2 times or more (preferably 2.5 times or more) than the distance between the second counterweight plate 133 in the first zone Z3 and the boundary of the first zone Z3, but the invention is not limited thereto.

Figure 4:
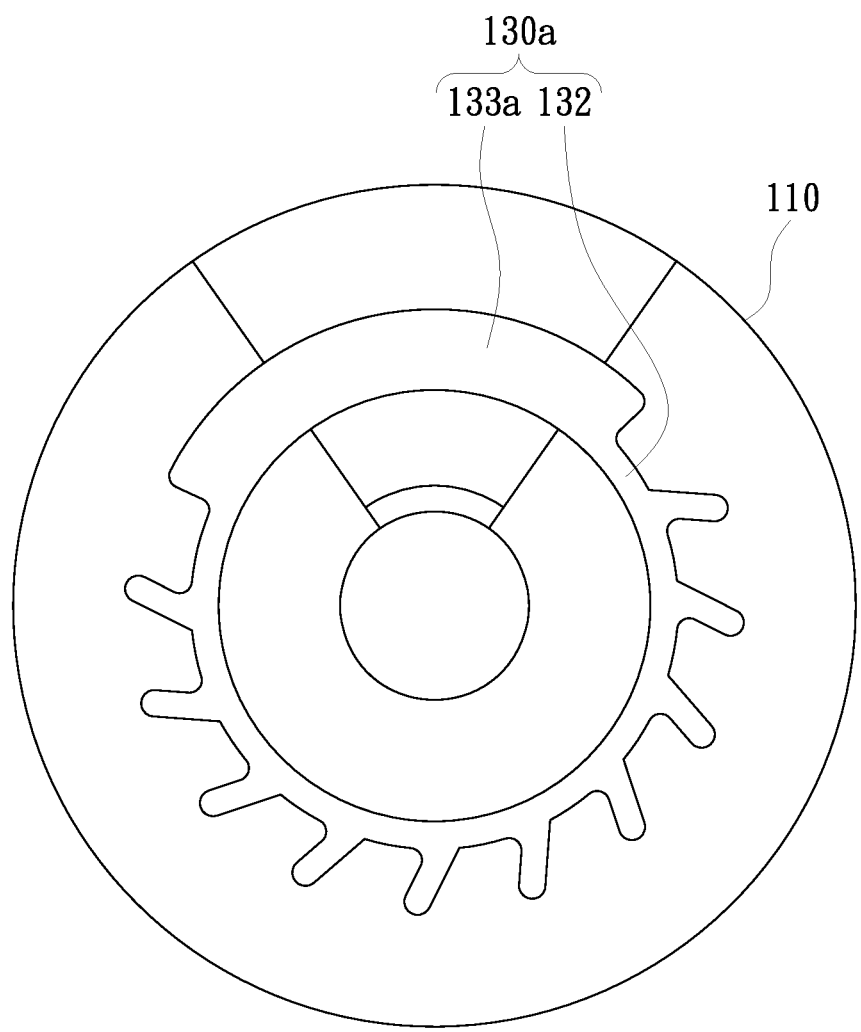
FIG. 4 is a schematic bottom view of a wavelength conversion element according to another embodiment of the invention.

Please refer to FIGS. 1 to 3 together. In this embodiment, the first counterweight plate 123 is, for example, disposed on the outer side of the first annular member 122, and the second counterweight plate 133 is, for example, disposed on the inner side of the second annular member 132, so as to adjust the balance of the rotatable disc 110 in the area where the first counterweight plate 123 and the second counterweight plate 133 overlap each other. In other embodiments, the arrangement position of the first counterweight plate 123 and the second counterweight plate 133 may be different from that of this embodiment. For example, please refer to FIG. 4, which is a schematic bottom view of a wavelength conversion element according to another embodiment of the invention. In the wavelength conversion element 100a of FIG. 4, the second counterweight plate 133a may be disposed on the outer side of the second annular member 132. In the embodiment of the invention, the arrangement of the first counterweight plate 123 and the second counterweight plate 133 can be adjusted according to the actual situation, and the invention is not limited thereto. In some embodiments, the first counterweight plate 123 may be disposed on the inner side of the first annular member 122, and the second counterweight plate 133 may be disposed on the inner side of the second annular member 132. In another embodiment, the first counterweight plate 123 may be disposed on the inner side of the first annular member 122, and the second counterweight plate 133 may be disposed on the outer side of the second annular member 132.

In this embodiment, the first annular member 122, the first spoilers 121 and the first counterweight plate 123 are, for example, integrally formed; and the second annular member 132, the second spoilers 131 and the second counterweight plate 133 are, for example, integrally formed. For example, the first annular member 122, the first spoilers 121 and the first counterweight plate 123 can be formed by stamping the first spoiler structure 120; and the second annular member 132, the second spoilers 131 and the second counterweight plate 133 can be formed by stamping the second spoiler structure 130. The material of the first spoiler structure 120 and the second spoiler structure 130 may include metal, non-metal, ceramic or composite material, etc., but the invention is not limited thereto. Incidentally, the first spoiler structure 120 and the second spoiler structure 130 can be fixed on the rotatable disc 110 by pasting, locking, riveting or welding, but the invention does not limit the specific fixing way. The diameters of the first annular member 122 and the second annular member 132 can be adjusted according to actual needs, and are not limited to those shown in the figures.

Please refer to FIGS. 1 and 3 again. The wavelength conversion element 100 of this embodiment can be configured as a wavelength conversion wheel (rotary wheel). Therefore, the wavelength conversion element 100 may further include a motor 140 (shown in FIG. 3) and a fixing ring 150. The motor 140 may include a rotating shaft 141. The fixing ring 150 may be sleeved on the rotating shaft 141 and clamp the annular substrate 111 with the motor 140, so that the annular substrate 111 can be stably and firmly rotated on the motor 140. The material of the fixing ring 150 may include metal, but is not limited thereto.

Compared with the prior art, the wavelength conversion element 100 of this embodiment adopts the first spoiler structure 120 and the second spoiler structure 130. In detail, the first spoiler structure 120 and the second spoiler structure 130 are both disposed on the rotatable disc 110, and at least one of the centroid M1 of the first spoiler structure 120 and the centroid M2 of the second spoiler structure 130 deviates from the center C of the rotatable disc 110. Therefore, the first spoiler structure 120 and the second spoiler structure 130 can reduce the initial unbalance of the rotatable disc 110, so that the wavelength conversion element 100 of this embodiment can reduce the use amount of counterweight glue provided on the fixing ring 150 (the counterweight glue may be even not necessary to be provided in some embodiments), which achieves the effect of making the wavelength conversion element 100 easier to manufacture, and can prevent the service life of the motor 140 from being affected by the excessive use of counterweight glue, and can also reduce the quality difference caused by the counterweight glue heated or irradiated by light, and thereby preventing the initial unbalance from increasing.

In the embodiment of FIGS. 1 and 2, both the first spoiler structure 120 and the second spoiler structure 130 are provided with a counterweight plate (i.e., the first counterweight plate 123 and the second counterweight plate 133), but the invention is not limited thereto. In the following, an embodiment in which the first spoiler structure or the second spoiler structure is provided with a counterweight plate will be described.

Figure 5:
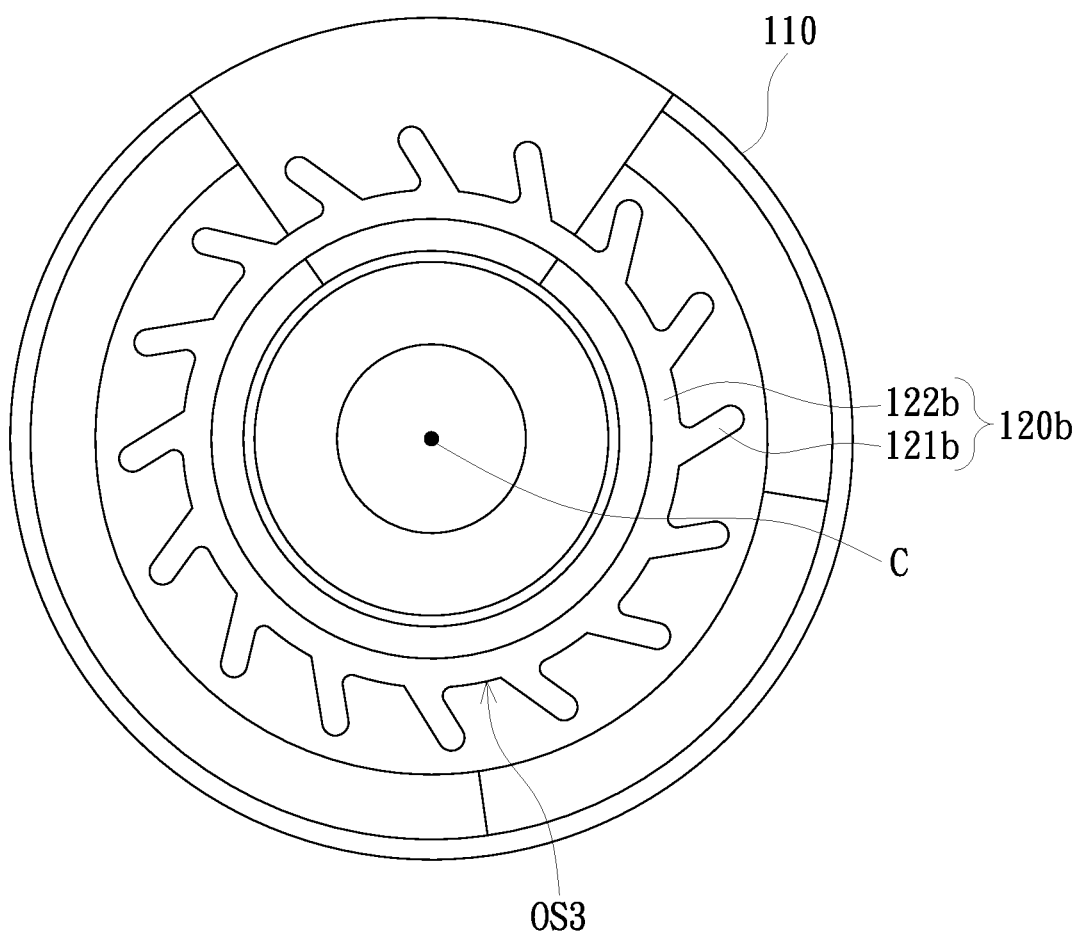
FIG. 5 is a schematic top view of a wavelength conversion element according to another embodiment of the invention.
Figure 6:
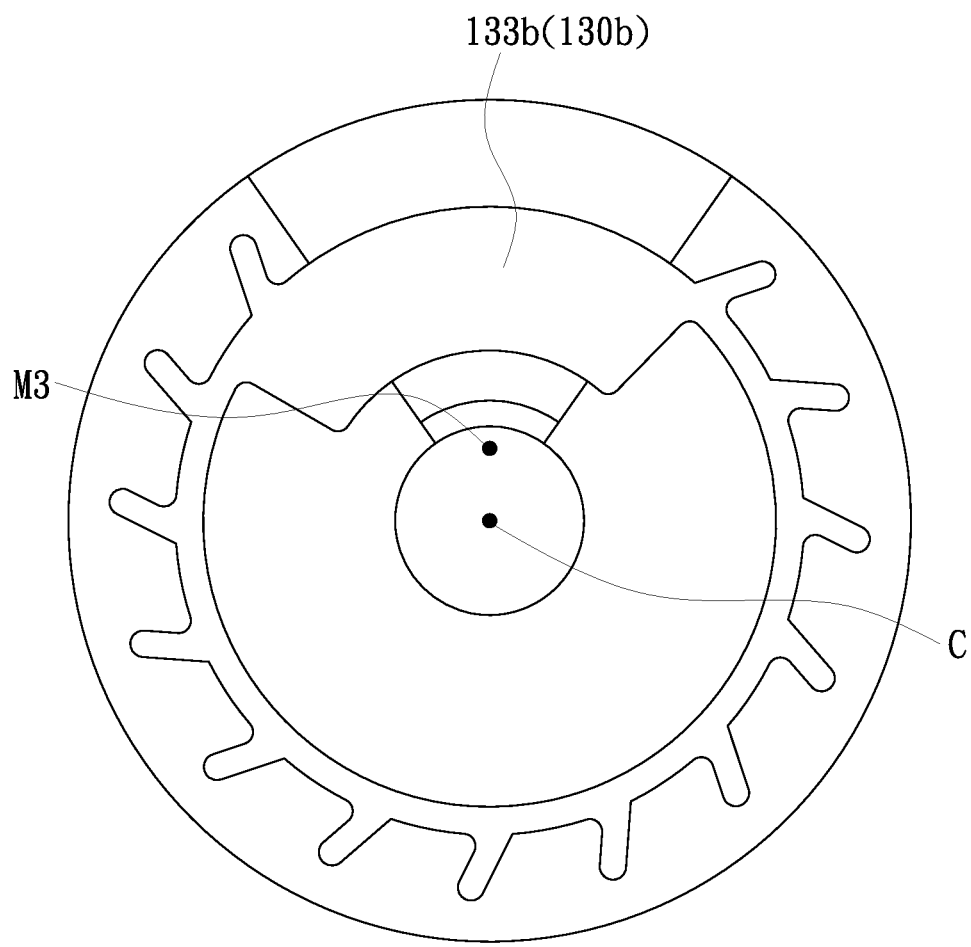
FIG. 6 is a schematic bottom view of the wavelength conversion element of FIG. 5.

FIG. 5 is a schematic top view of a wavelength conversion element according to another embodiment of the invention. FIG. 6 is a schematic bottom view of the wavelength conversion element of FIG. 5. The features and advantages of the wavelength conversion element 100b of this embodiment are similar to those of the previous embodiments, and only the differences will be described below. Referring to FIGS. 5 and 6, the first spoiler structure 120b may include a plurality of first spoilers 121b and a first annular member 122b. In detail, the first spoilers 121b may be equidistantly distributed on the outer annular surface OS3 of the first annular member 122b, so that the centroid (not shown) of the first spoiler structure 120b overlaps with the center C of the rotatable disc 110. In addition, because the first spoilers 121b are equidistantly distributed on the outer annular surface OS3, the first spoiler structure 120b of this embodiment can further improve the heat dissipation efficiency of the wavelength conversion element 100b. The second spoiler structure 130b has a second counterweight plate 133b, which makes the centroid M3 of the second spoiler structure 130b deviate from the center C of the rotatable disc 110. Incidentally, in this embodiment, the aforementioned first difference is smaller than the aforementioned second difference.

Figure 7:
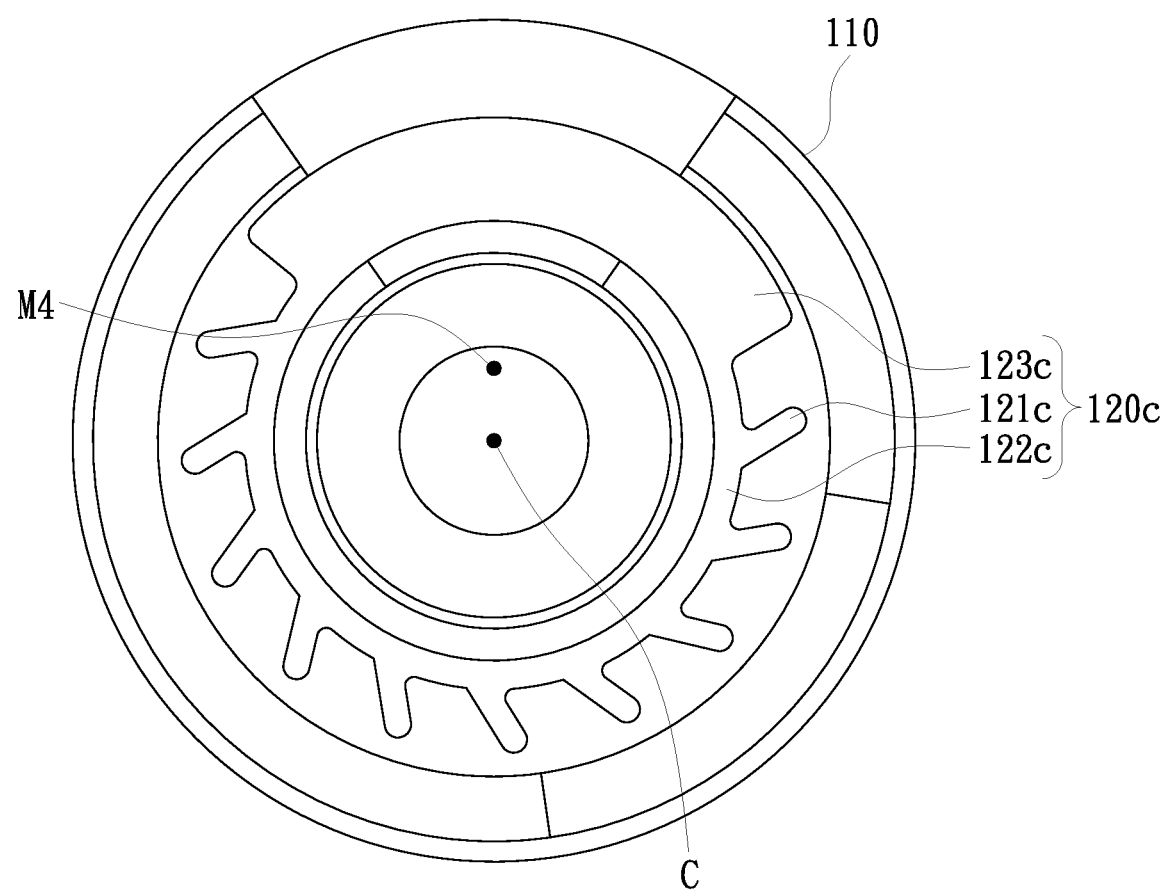
FIG. 7 is a schematic top view of a wavelength conversion element according to another embodiment of the invention.
Figure 8:
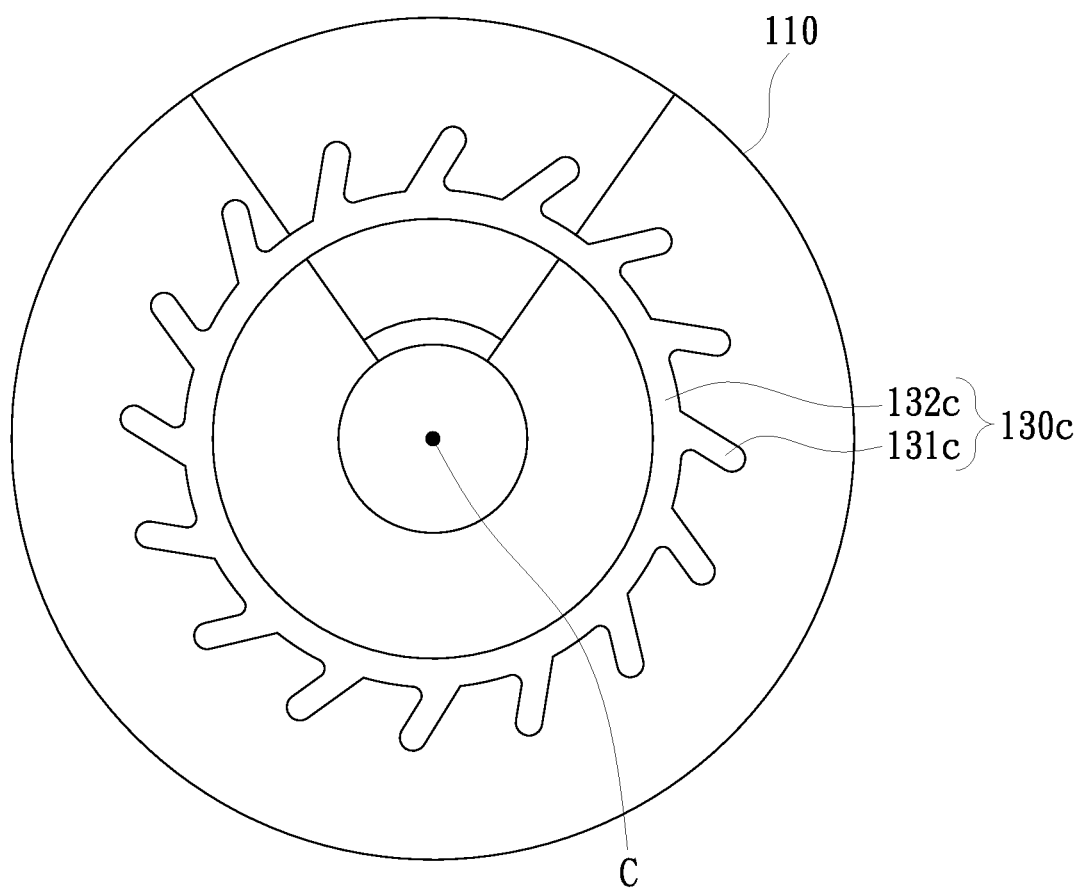
FIG. 8 is a schematic bottom view of the wavelength conversion element of FIG. 7.

FIG. 7 is a schematic top view of a wavelength conversion element according to another embodiment of the invention. FIG. 8 is a bottom schematic view of the wavelength conversion element of FIG. 7. The features and advantages of the wavelength conversion element 100c of this embodiment are similar to those of the previous embodiments, and only the differences will be described below. Referring to FIGS. 7 and 8, the first spoiler structure 120c may include a plurality of first spoilers 121c, a first annular member 122c and a first counterweight plate 123c. Because the weight of the first counterweight plate 123c is greater than the weight of each first spoiler 121c, the centroid M4 of the first spoiler structure 120c deviates from the center C of the rotatable disc 110. On the other hand, the second spoiler structure 130c may include a plurality of second spoilers 131c and a second annular member 132c. The second spoilers 131c may be equidistantly disposed on the second annular member 132c, so that the centroid (not shown) of the second spoiler structure 130c overlaps with the center C of the rotatable disc 110. In addition, the design in which the second spoilers 131c are equidistantly disposed on the second annular member 132c can further improve the heat dissipation efficiency of the wavelength conversion element 100c.

In other embodiments, the first spoiler structure and the second spoiler structure may not be provided with the counterweight plate, but adjusting the position of the centroid of the first spoiler structure and the second spoiler structure by changing the distribution density or weight of the spoilers. The detail will be described below.

Figure 9:
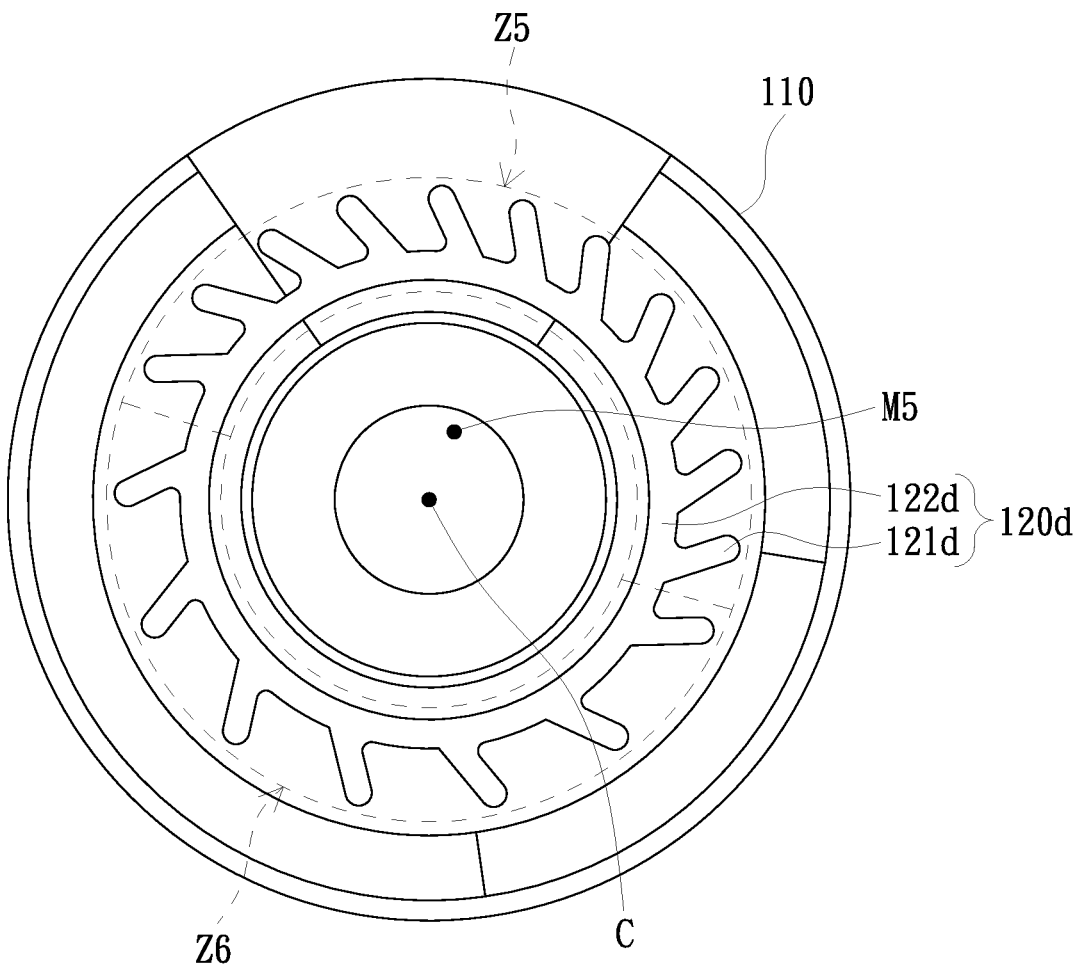
FIG. 9 is a schematic top view of a wavelength conversion element according to another embodiment of the invention.
Figure 10:
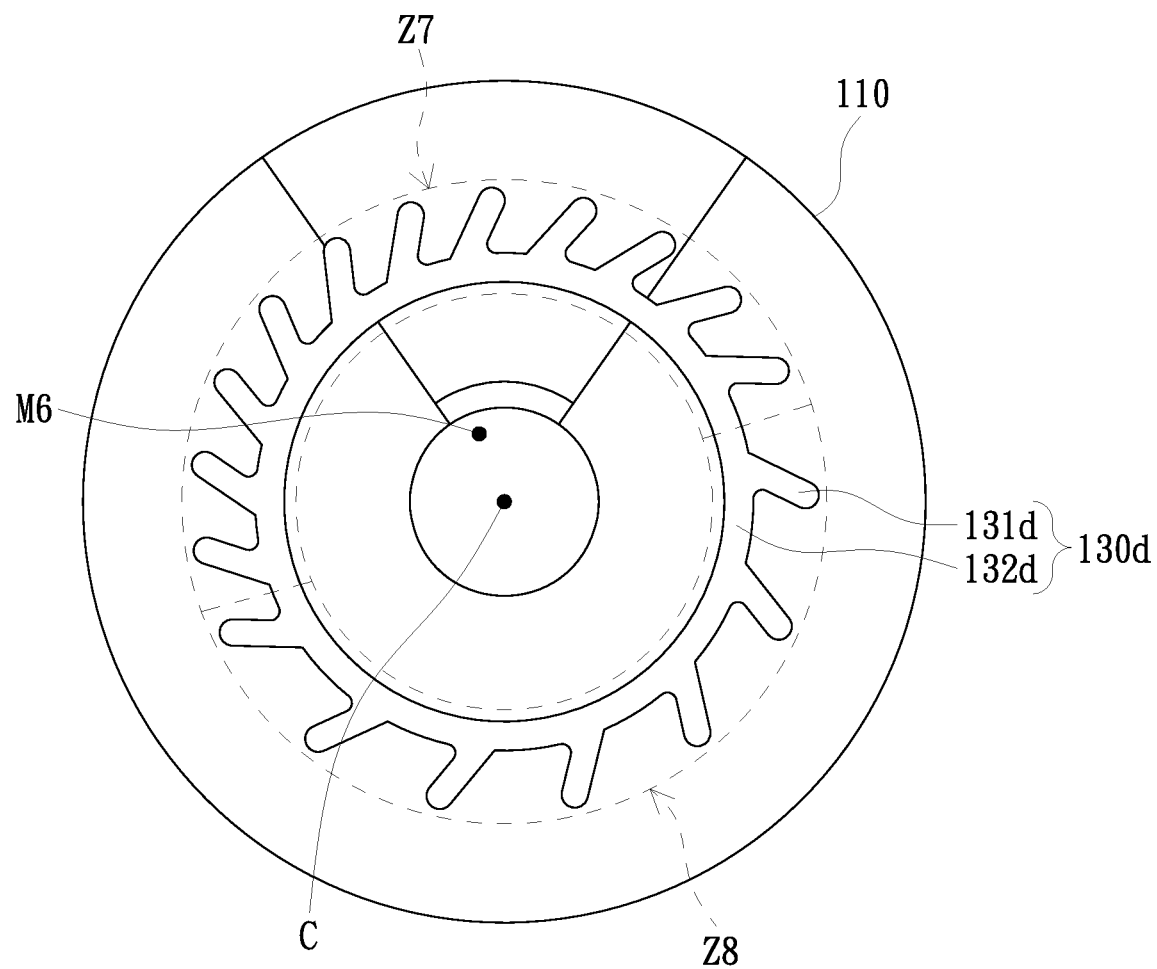
FIG. 10 is a schematic bottom view of the wavelength conversion element of FIG. 9.

FIG. 9 is a schematic top view of a wavelength conversion element according to another embodiment of the invention. FIG. 10 is a schematic bottom view of the wavelength conversion element of FIG. 10. The features and advantages of the wavelength conversion element 100d of this embodiment are similar to those of the previous embodiments, and only the differences will be described below. Referring to FIGS. 9 and 10, the first spoiler structure 120d may include a plurality of first spoilers 121d and a first annular member 122d, wherein the first spoilers 121d are, for example, non-equidistantly distributed on the first annular member 122d. The second spoiler structure 130d may include a plurality of second spoilers 131d and a second annular member 132d, wherein the second spoilers 131d are, for example, non-equidistantly distributed on the second annular member 132d. Specifically, the distance between any two adjacent first spoilers 121d in the first zone Z5 is smaller than that in the second zone Z6, so that the mass density of the first zone Z5 is greater than that of the second zone Z6. Therefore, the centroid M5 of the first spoiler structure 120d deviates from the center C of the rotatable disc 110. Incidentally, the distance between any two adjacent first spoilers 121d in the second zone Z6 may be 2 times or more (preferably 2.5 times or more) than that in the first zone Z5, but the invention is not limited thereto. Similarly, the mass density of the second spoiler structure 130d in the first zone Z7 is greater than that in the second zone Z8, so that the centroid M6 of the second spoiler structure 130d deviates from the center C of the rotatable disc 110. In addition, the first spoilers 121d and the second spoilers 131d can further improve the heat dissipation efficiency of the wavelength conversion element 100d. Incidentally, in this embodiment, the aforementioned first difference is equal to the aforementioned second difference, but the invention is not limited thereto.

Figure 11:
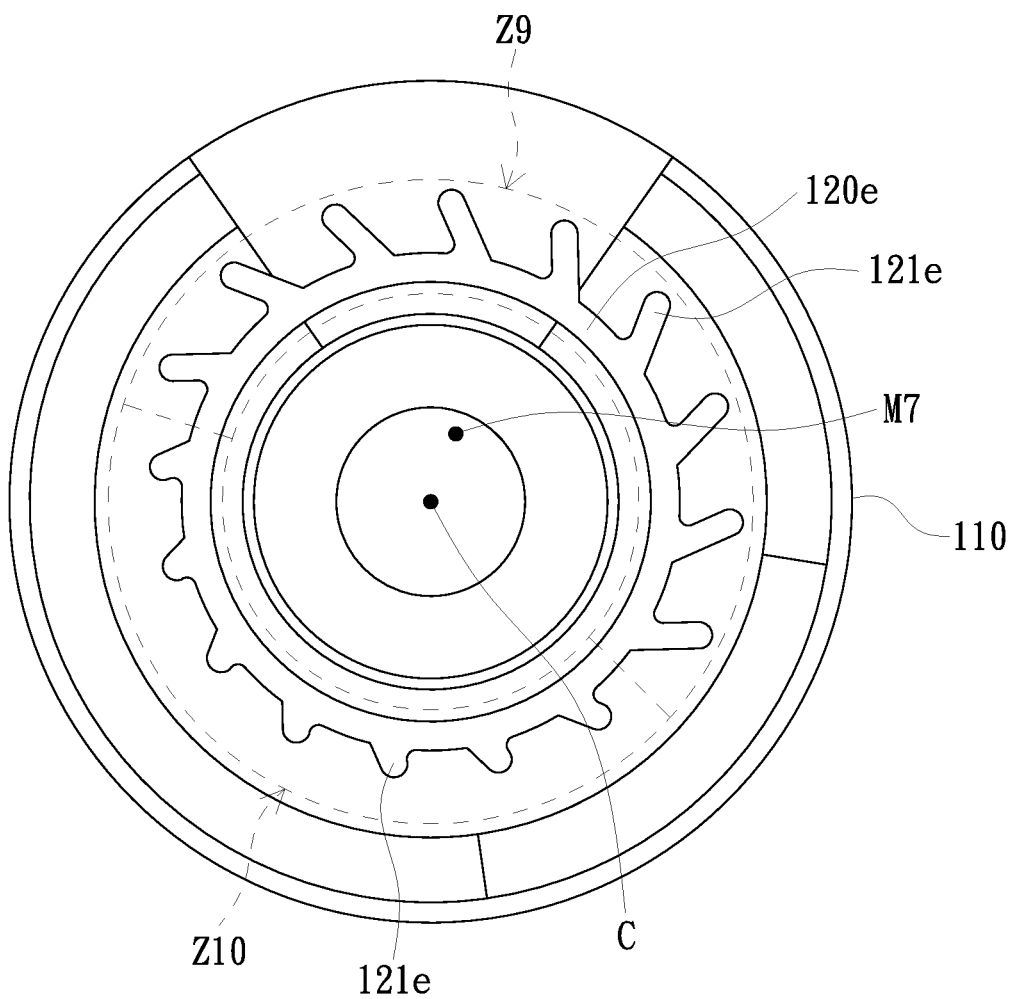
FIG. 11 is a schematic top view of a wavelength conversion element according to another embodiment of the invention.
Figure 12:
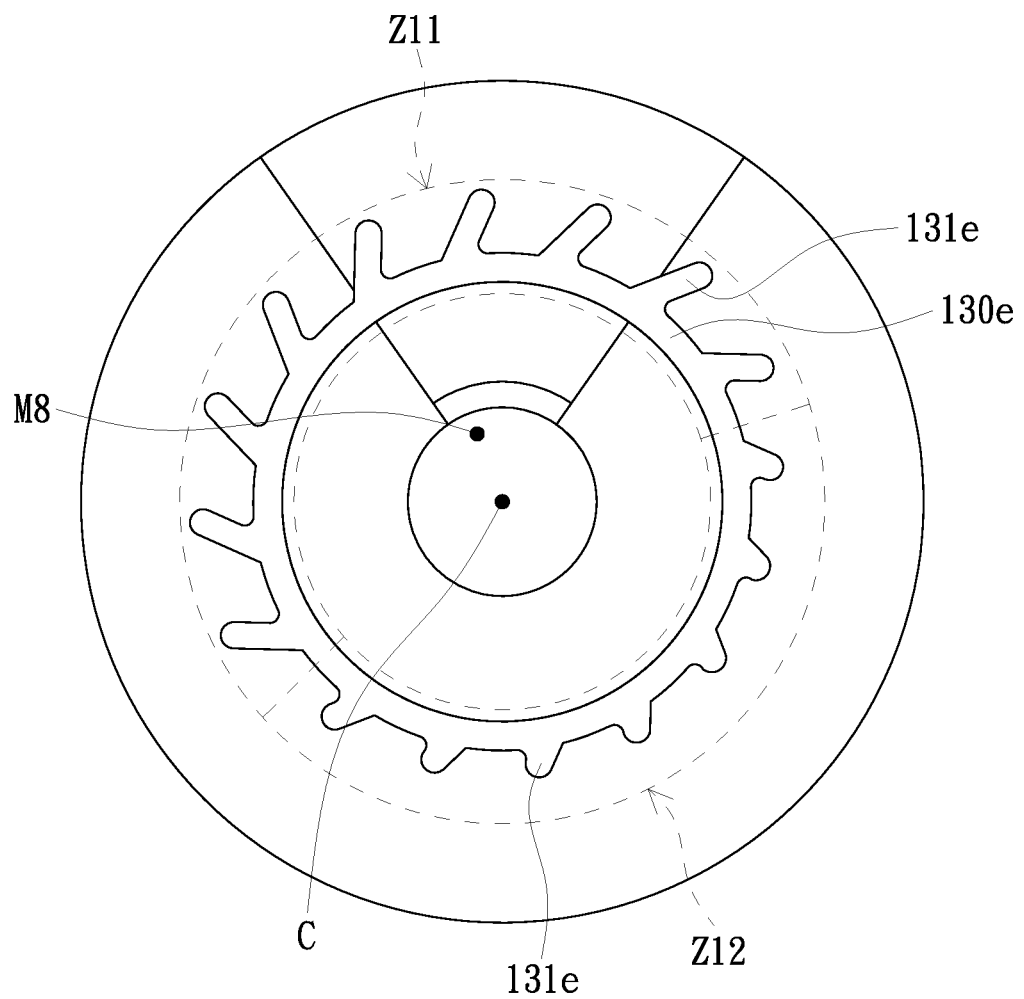
FIG. 12 is a schematic bottom view of the wavelength conversion element of FIG. 11.

FIG. 11 is a schematic top view of a wavelength conversion element according to another embodiment of the invention. FIG. 12 is a schematic bottom view of the wavelength conversion element of FIG. 11. The features and advantages of the wavelength conversion element 100e of this embodiment are similar to those of the embodiment of FIG. 9, and only the differences will be described below. Referring to FIGS. 11 and 12, the weights of the first spoilers 121e may be different, and the weights of the second spoilers 131e may also be different. For example, the weight of the first spoiler 121e located in the first zone Z9 may be greater than the weight of the first spoiler 121e located in the second zone Z10, so that the centroid M7 of the first spoiler structure 120e deviates from the center C of the rotatable disc 110. Similarly, the weight of the second spoiler 131e located in the first zone Z11 may be greater than the weight of the second spoiler 131e located in the second zone Z12, so that the centroid M8 of the second spoiler structure 130e deviates from the center C of the rotatable disc 110. Incidentally, in this embodiment, the weight difference of the first spoilers 121e and the second spoilers 131e is generated by the difference in length. However, in other embodiments, the aforementioned weight difference can be generated by the difference in width or thickness. The invention does not limit the specific way for generating the aforementioned weight difference.

Figure 13:
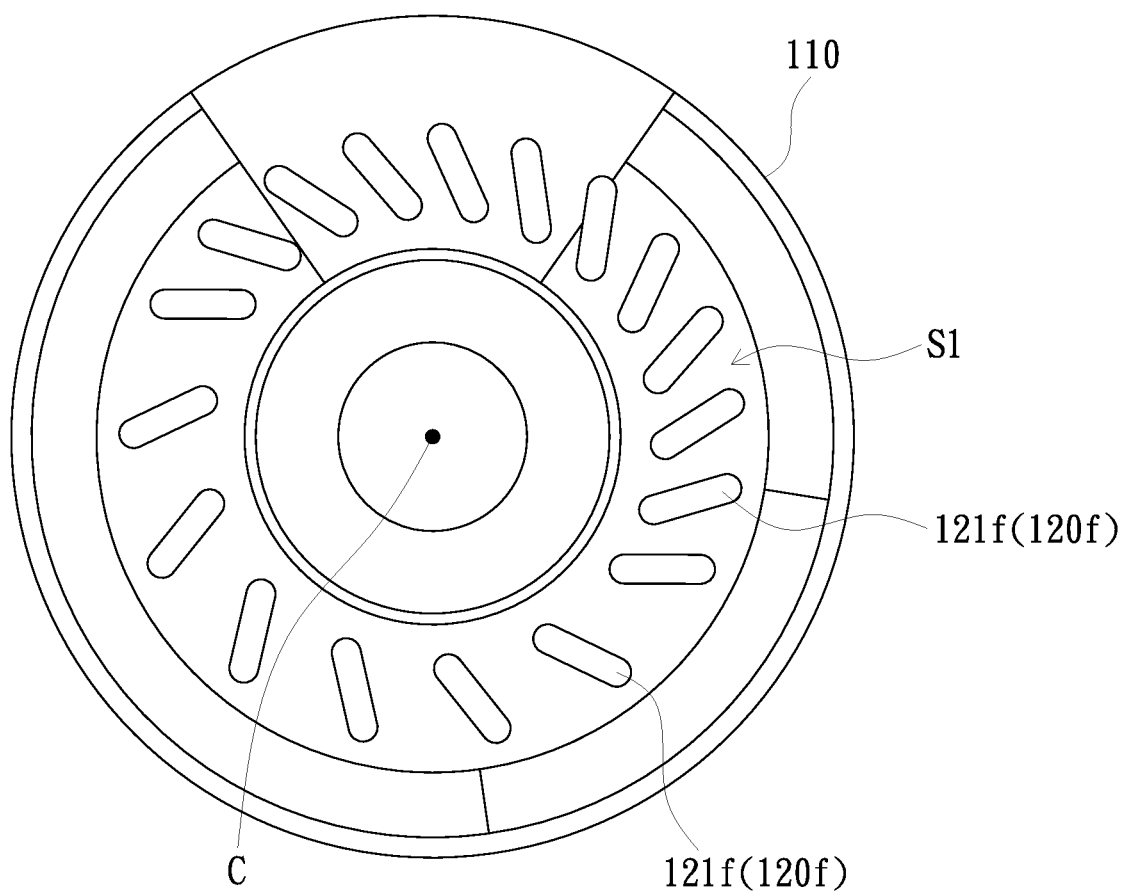
FIG. 13 is a schematic top view of a wavelength conversion element according to another embodiment of the invention.
Figure 14:
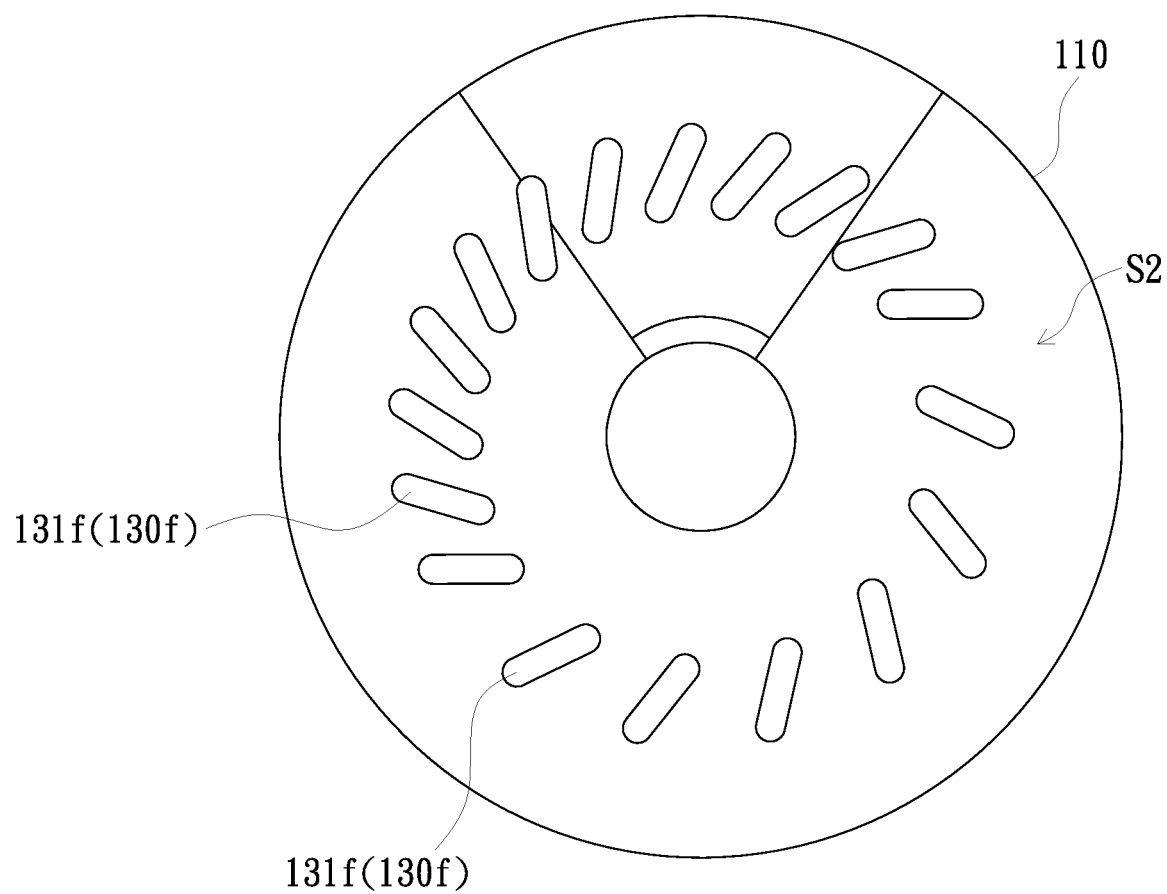
FIG. 14 is a schematic bottom view of the wavelength conversion element of FIG. 13.

FIG. 13 is a schematic top view of a wavelength conversion element according to another embodiment of the invention. FIG. 14 is a schematic bottom view of the wavelength conversion element of FIG. 13. The features and advantages of the wavelength conversion element 100f of this embodiment are similar to those of the embodiment of FIG. 9, and only the differences will be described below. Referring to FIG. 13 and FIG. 14, the first spoiler structure 120f only includes a plurality of first spoilers 121f, and the second spoiler structure 130f only includes a plurality of second spoilers 131f. The first spoilers 121f and the second spoilers 131f are discretely distributed on the supporting surface S1 and the back surface S2, respectively. The first spoiler 121f and the second spoiler 131f may be glue strips. In detail, the first spoilers 121f and the second spoilers 131f can be formed on the rotatable disc 110 by coating, thereby having the advantages of convenient processing and high processing flexibility. In this embodiment, the material of the first spoiler 121f and the second spoiler 131f may include silica glue or thermal conductive glue, but is not limited thereto. In addition, similar to the embodiment of FIG. 9, the first spoilers 121f and the second spoilers 131f of this embodiment are non-equidistantly distributed to adjust the initial unbalance of the rotatable disc 110. Incidentally, the first spoilers 121f of this embodiment are non-equidistantly distributed, so the centroid (not shown) of the first spoiler structure 120f deviates from the center C of the rotatable disc 110. The features of the second spoiler structure 130f are similar to those of the first spoiler structure 120f, and no redundant detail is to be given herein. In other embodiments, part of the first spoilers 121f and part of the second spoilers 131f can be coated into a sheet shape, and the invention does not limit the specific coating shape.

Figure 15:
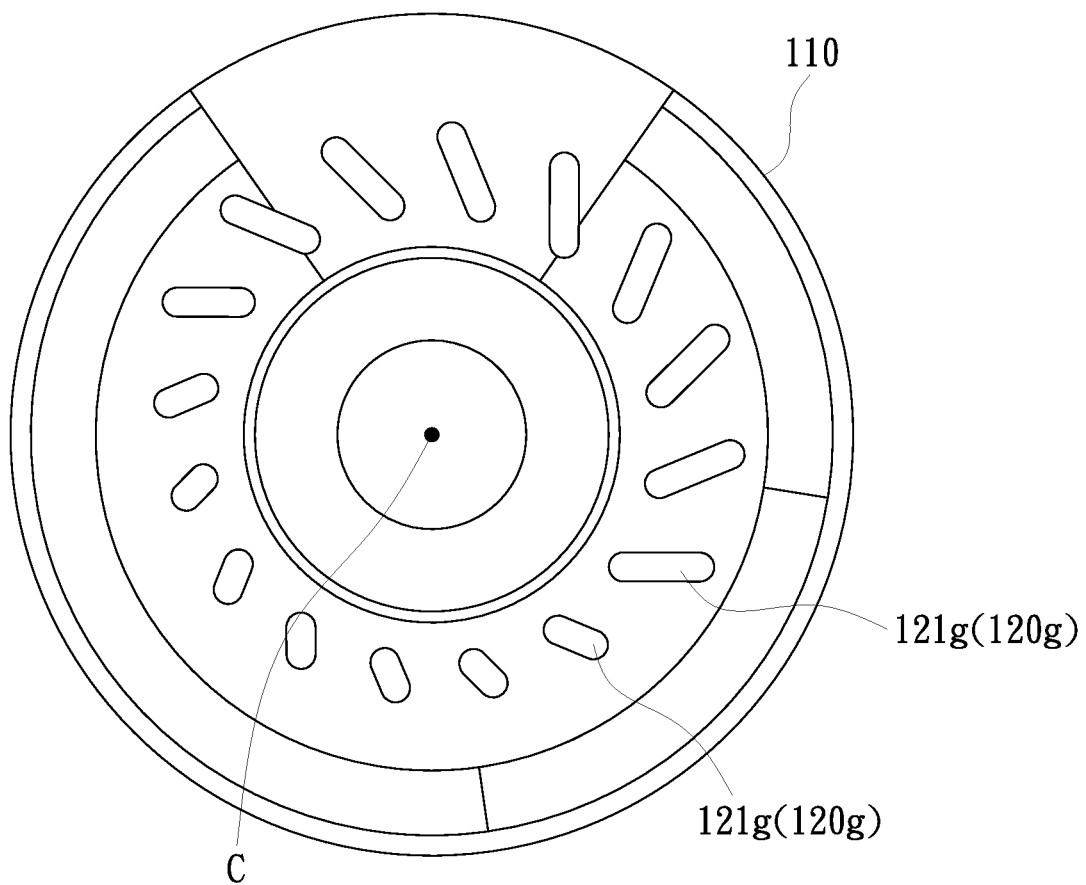
FIG. 15 is a schematic top view of a wavelength conversion element according to another embodiment of the invention.
Figure 16:
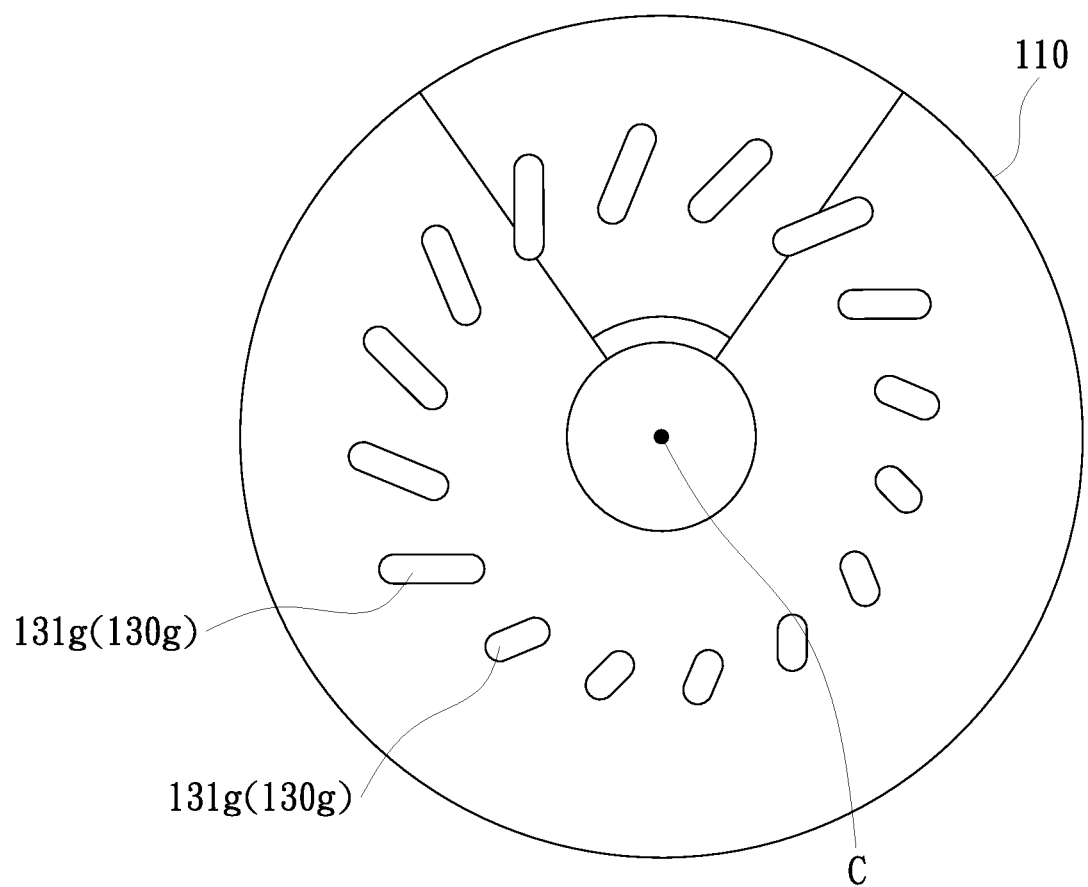
FIG. 16 is a schematic bottom view of the wavelength conversion element of FIG. 15.

FIG. 15 is a schematic top view of a wavelength conversion element according to another embodiment of the invention. FIG. 16 is a schematic bottom view of the wavelength conversion element of FIG. 15. The features and advantages of the wavelength conversion element 100g of this embodiment are similar to those of the embodiment of FIG. 13, and only the differences will be described below. Referring to FIGS. 15 and 16, the weights of the first spoilers 121g may be different, so that the centroid (not shown) of the first spoiler structure 120g deviates from the center C of the rotatable disc 110. Similarly, the weights of the second spoilers 131g may be different, so that the centroid (not shown) of the second spoiler structure 130g deviates from the center C of the rotatable disc 110. Because the features of the first spoilers 121g and the second spoilers 131g are similar to those in the embodiment of FIG. 11, no redundant detail is to be given herein.

Figure 17:
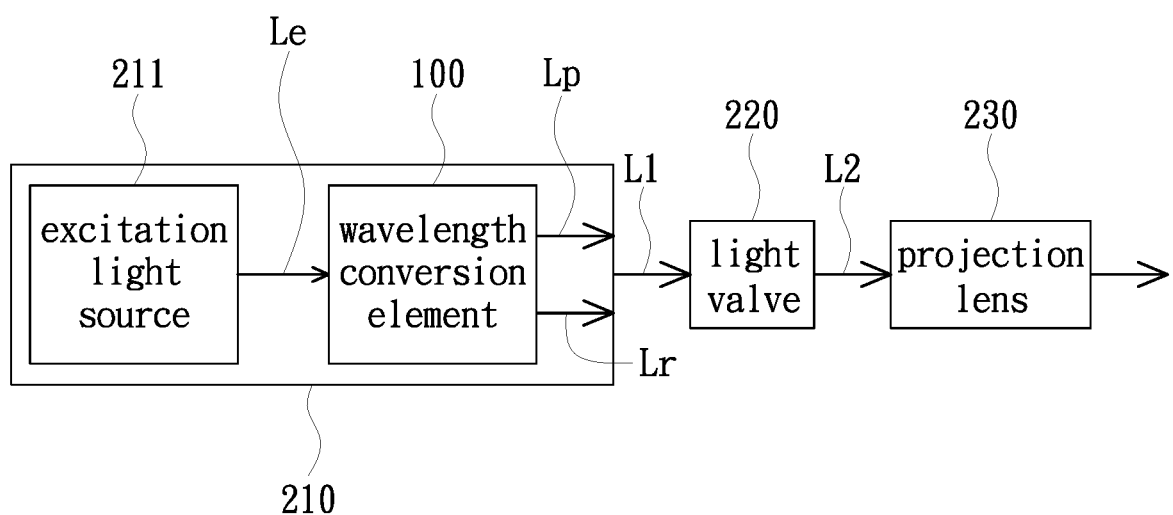
FIG. 17 is a block diagram of a projection device according to an embodiment of the invention.

FIG. 17 is a block diagram of a projection device according to an embodiment of the invention. Referring to FIG. 17, the projection device 200 includes an illumination system 210, a light valve 220 and a projection lens 230. The illumination system 210 is configured to provide an illumination beam L1. The light valve 220 is disposed on the transmission path of the illumination beam L1 and is configured to convert the illumination beam L1 into an image beam L2. The projection lens 230 is disposed on the transmission path of the image beam L2 and is configured to project the image beam L2. The illumination system 210 includes an excitation light source 211 and the wavelength conversion element 100. The excitation light source 211 is configured to provide an excitation beam Le. In other embodiments, the wavelength conversion element 100 may be replaced with the wavelength conversion element 100a, 100b, 100c, 100d or 100g.

In this embodiment, the illumination system 210 may include the excitation light source 211 and the wavelength conversion element 100. The excitation light source 211 includes, for example, a light emitting diode (LED) or a laser diode (LD), wherein the quantity of the light emitting diode or the laser diode may be one or plural. For example, the light emitting diodes (or laser diodes) may be arranged in a matrix when the quantity of the light emitting diodes (or laser diodes) is plural. The wavelength conversion element 100 is disposed on the transmission path of the excitation beam Le. Specifically, the wavelength conversion element 100 sequentially enters the transmission path of the excitation beam Le and converts the excitation beam Le into a converted beam Lp. In addition, the beam Lr is the excitation beam Le that is not converted into the converted beam Lp by the wavelength conversion element 100. The aforementioned illumination beam L1 includes the beam Lr and the converted beam Lp. Because the features of the wavelength conversion element 100 have been described in detail in the foregoing, no redundant detail is to be given herein.

The light valve 220 is, for example, a digital micromirror device (DMD), a liquid crystal on silicon (LCoS) or a liquid crystal display (LCD), but is not limited thereto. In addition, the embodiment does not limit the quantity of the light valves. For example, the projection device 200 of the embodiment may use single-chip liquid crystal display panel or three-chip liquid crystal display panel structure, but is not limited thereto.

The projection lens 230 includes, for example, one or more optical lenses, and the diopter of the optical lenses may be the same or different from each other. For example, the optical lens may include various non-planar lenses such as biconcave lenses, lenticular lenses, meniscus lenses, convex and concave lenses, plano-convex lenses, and plano-concave lenses, or any combination of the above-mentioned non-planar lenses. On the other hand, the projection lens 230 may also include a planar optical lens. The invention does not limit the specific structure of the projection lens 230.

Compared with the prior art, the projection device 200 of this embodiment can improve the durability due to adopting the wavelength conversion element 100.

In summary, in the wavelength conversion element of the invention, because the centroid of at least one of the first spoiler structure and the second spoiler structure disposed on opposite sides of the rotatable disc deviates from the center of the rotatable disc, the position of the centroid of the rotatable disc can be adjusted in the axial and radial directions of the rotatable disc, thereby reducing the initial unbalance of the rotatable disc. In this way, the wavelength conversion element of the invention can reduce or even omit the installation of counterweight glue. Because the use amount of counterweight glue is reduced, it can prevent the service life of the motor from being affected by the excessive use of counterweight glue, and can also reduce the quality difference caused by the counterweight glue heated or irradiated by light, and thereby preventing the initial unbalance from increasing. In addition, the projection device of the invention can improve the durability due to adopting the aforementioned wavelength conversion element.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first spoiler structure, the second spoiler structure, the first track, the second track, the first spoiler, the second spoiler, the first annular member, the second annular member, the first counterweight plate, the second counterweight plate, the first zone and the second zone are only used for distinguishing various elements and do not limit the number of the elements.

What is claimed is:

1. A wavelength conversion element, comprising a rotatable disc, a first spoiler structure and a second spoiler structure, wherein:
   the rotatable disc has a supporting surface and a back surface opposite to the supporting surface;
   the first spoiler structure is disposed on the supporting surface and arranged along a first track surrounding a center of the rotatable disc; and
   the second spoiler structure is disposed on the back surface and arranged along a second track surrounding the center,
   wherein a centroid of at least one of the first spoiler structure and the second spoiler structure is deviated from the center.

2. The wavelength conversion element according to claim 1, wherein the first spoiler structure comprises a plurality of first spoilers, and the second spoiler structure comprises a plurality of second spoilers.

3. The wavelength conversion element according to claim 2, wherein the first spoiler structure further comprises a first annular member overlapping with the first track, the plurality of first spoilers are distributed along the first tract, and one end of each of the plurality of first spoilers is connected to an outer annular surface of the first annular member, wherein the second spoiler structure further comprises a second annular member overlapping with the second track, the plurality of second spoilers are distributed along the second track, and one end of each of the plurality of second spoilers is connected to an outer annular surface of the second annular member.

4. The wavelength conversion element according to claim 3, wherein the first spoiler structure further comprises a first counterweight plate connected to the first annular member, and/or the second spoiler structure further comprises a second counterweight plate connected to the second annular member.

5. The wavelength conversion element according to claim 4, wherein a weight of the first counterweight plate is greater than a weight of each of the plurality of first spoilers, and/or a weight of the second counterweight plate is greater than a weight of each of the plurality of second spoilers.

6. The wavelength conversion element according to claim 3, wherein the first spoiler structure further comprises a first counterweight plate connected to the first annular member, the second spoiler structure further comprises a second counterweight plate connected to the second annular member, the first counterweight plate is disposed on an inner side of the first annular member and the second counterweight plate is disposed on an outer side of the second annular member, or the first counterweight plate is disposed on an outer side of the first annular member and the second counterweight plate is disposed on an inner side of the second annular member.

7. The wavelength conversion element according to claim 3, wherein the first annular member and the plurality of first spoilers are integrally formed, and the second annular member and the plurality of second spoilers are integrally formed.

8. The wavelength conversion element according to claim 2, wherein the plurality of first spoilers and the plurality of second spoilers are glue strips.

9. The wavelength conversion element according to claim 2, wherein the plurality of first spoilers are non-equidistantly distributed, and/or the plurality of second spoilers are non-equidistantly distributed.

10. The wavelength conversion element according to claim 2, wherein weights of the plurality of first spoilers are different, and/or weights of the plurality of second spoilers are different.

11. The wavelength conversion element according to claim 1, wherein the first spoiler structure and the second spoiler structure both comprise a first zone and a second zone, a mass density of the first zone is greater than a mass density of the second zone, the mass densities of the first zone and the second zone of the first spoiler structure have a first difference, the mass densities of the first zone and the second zone of the second spoiler structure have a second difference, and the first difference is greater than, equal to, or smaller than the second difference.

12. The wavelength conversion element according to claim 1, wherein at least one of the first spoiler structure and the second spoiler structure comprises a first zone and a second zone, a mass density of the first zone is greater than a mass density of the second zone, the rotatable disc further comprises an annular substrate and a plurality of wavelength conversion layers, the plurality of wavelength conversion layers are disposed on the annular substrate, and the wavelength conversion layer with the highest density occupies a first central angle of the annular substrate, wherein within the first central angle, an angle occupied by the first zone is smaller than an angle occupied by the second zone.

13. The wavelength conversion element according to claim 1, wherein at least one of the first spoiler structure and the second spoiler structure comprises a first zone and a second zone, a mass density of the first zone is greater than a mass density of the second zone, the rotatable disc further comprises an annular substrate, the annular substrate has a wavelength maintenance zone, and the wavelength maintenance zone occupies a central angle of the annular substrate, wherein within the central angle, an angle occupied by the first zone is greater than an angle occupied by the second zone.

14. A projection device, comprising an illumination system, a light valve and a projection lens, the illumination system being configured to provide an illumination beam, the light valve being disposed on a transmission path of the illumination beam and configured to convert the illumination beam into an image beam, the projection lens being disposed on a transmission path of the image beam and configured to project the image beam, and the illumination system comprising an excitation light source and a wavelength conversion element, wherein:
   the excitation light source is configured to provide an excitation beam; and the wavelength conversion element is disposed on a transmission path of the excitation beam and comprises a rotatable disc, a first spoiler structure and a second spoiler structure, wherein:

the rotatable disc has a supporting surface and a back surface opposite to the supporting surface;

the first spoiler structure is disposed on the supporting surface and arranged along a first track surrounding a center of the rotatable disc; and the second spoiler structure is disposed on the back surface and arranged along a second track surrounding the center, wherein a centroid of at least one of the first spoiler structure and the second spoiler structure is deviated from the center.

15. The projection device according to claim 14, wherein the first spoiler structure comprises a plurality of first spoilers, and the second spoiler structure comprises a plurality of second spoilers.

16. The projection device according to claim 15, wherein the first spoiler structure further comprises a first annular member overlapping with the first track, the plurality of first spoilers are distributed along the first tract, and one end of each of the plurality of first spoilers is connected to an outer annular surface of the first annular member, wherein the second spoiler structure further comprises a second annular member overlapping with the second track, the plurality of second spoilers are distributed along the second track, and one end of each of the plurality of second spoilers is connected to an outer annular surface of the second annular member.

17. The projection device according to claim 16, wherein the first spoiler structure further comprises a first counterweight plate connected to the first annular member, and/or the second spoiler structure further comprises a second counterweight plate connected to the second annular member.

18. The projection device according to claim 16, wherein the first annular member and the plurality of first spoilers are integrally formed, and the second annular member and the plurality of second spoilers are integrally formed.

19. The projection device according to claim 16, wherein the plurality of first spoilers and the plurality of second spoilers are glue strips.

20. The projection device according to claim 14, wherein the first spoiler structure and the second spoiler structure both comprise a first zone and a second zone, a mass density of the first zone is greater than a mass density of the second zone, the mass densities of the first zone and the second zone of the first spoiler structure have a first difference, the mass densities of the first zone and the second zone of the second spoiler structure have a second difference, and the first difference is greater than, equal to, or smaller than the second difference.

* * * * *